United States Patent [19]
Ziske et al.

[11] Patent Number: 5,916,535
[45] Date of Patent: Jun. 29, 1999

[54] DEVICE FOR GENERATING OXYGEN

[75] Inventors: Olaf Ziske, Nehms; Gerd Wotha, Ratekau, both of Germany

[73] Assignee: Drägerwerk AG, Lübeck, Germany

[21] Appl. No.: 08/977,025

[22] Filed: Nov. 24, 1997

[30] Foreign Application Priority Data

Jun. 28, 1997 [DE] Germany .................. 197 27 539

[51] Int. Cl.⁶ .................. A61M 15/02; A61M 15/00; A62B 9/02; C01B 13/00
[52] U.S. Cl. .................. 423/579; 128/202.25; 128/202.26; 128/205.12; 128/205.24; 128/205.28; 423/579
[58] Field of Search ............ 423/579; 128/202.26, 128/202.25, 205.24, 205.12, 205.28, 422.12

[56] References Cited

U.S. PATENT DOCUMENTS

| | | | |
|---|---|---|---|
| 4,342,725 | 8/1982 | Collins | 422/126 |
| 4,421,071 | 12/1983 | Paul | 123/1 A |
| 4,743,429 | 5/1988 | Rothernberger | 422/120 |
| 4,822,572 | 4/1989 | Van Der Smissen et al. | 422/126 |
| 5,322,669 | 6/1994 | Bechthold et al. | 422/120 |
| 5,336,470 | 8/1994 | Bechthold et al. | 422/120 |
| 5,653,226 | 8/1997 | Heyer et al. | 128/202.26 |

FOREIGN PATENT DOCUMENTS 44 37 895 C1  5/1996  Germany .

Primary Examiner—Gary P. Straub
Assistant Examiner—Cam N. Nguyen
Attorney, Agent, or Firm—McGlew and Tuttle, P.C.

[57] ABSTRACT

A device for generating oxygen by the thermal decomposition of a chemical located in a cartridge housing is improved such that a profile of the oxygen release can be set in a simple manner. To accomplish this a delivery line drawing off the oxygen generated is connected to a longitudinal side of the cartridge housing.

11 Claims, 2 Drawing Sheets

DEVICE FOR GENERATING OXYGEN

FIELD OF THE INVENTION

The present invention pertains to a device for generating oxygen by the thermal decomposition of a chemical located in a cartridge housing, whose reaction into a spent chemical takes place, beginning from an activation point, along a reaction front propagating in the interior space of the cartridge housing in the direction of the unspent chemical to a reaction end point, with a connection, which leads out of a longitudinal side of the cartridge housing between the activation point and the reaction end point and over which connection the reaction front passes, and with a delivery line drawing off the oxygen being generated.

BACKGROUND OF THE INVENTION

A device of this type has become known from DE 44 37 895 C1. The intensity of oxygen production is controlled in the prior-art device by the deflection of the oxygen generated within a chemical-filled cartridge housing from the area of the unspent chemical into the area of the spent chemical. This effect is based on the fact that deflecting the oxygen into the area behind the reaction front decelerates the chemical reaction, because the spread of the dusts and gases generated during the reaction, which act as a catalyst, to the unspent chemical is hindered. Delivery lines are connected to the cartridge housing at opposite points, namely, at the activation point and at a reaction end point, which is the last to react, and among these delivery lines, at least the delivery line leading from the reaction end point is provided with a throttling point. Depending on the opening cross section of the throttling point, more or less oxygen is deflected into the area of the spent chemical. An especially uniform flow of oxygen can be set by means of a double diaphragm valve, which is connected to the delivery lines and is controlled as a function of the pressure building up in the interior space of the cartridge housing. The pressure in the interior space of the cartridge housing is measured with a line that opens into the interior space of the cartridge approximately in the center of the cartridge housing.

Uniform release of oxygen can be set with the prior-art device during the thermal decomposition of the chemical. However, there are applications in which a predetermined profile of the release of oxygen is required, i.e., it must first increase and then decrease, or the release of oxygen must be high at a first step and the oxygen production must then be reduced in a second step. Even though such a profile would be able to be generated with the prior-art device by setting different set points in advance, this would be linked with a rather high circuit complexity.

SUMMARY AND OBJECTS OF THE INVENTION

The primary object of the present invention is to improve a device of this type such that a predetermined profile of oxygen release can be set in a simple manner.

According to the invention, a device for generating oxygen by the thermal decomposition of a chemical located in a said cartridge housing is provided. The chemical reacts into a spent chemical beginning from an activation point, along an reaction front, propagating in the interior space of the cartridge housing in the direction of an unspent chemical to a reaction end point. A connection is provided which leads out of a longitudinal side of the cartridge housing between the activation point and the reaction end point. The reaction front passes over this connection. A delivery line is provided for drawing off the oxygen being generated. The connection is in flow connection with the delivery line.

The advantage of the present invention is essentially that by arranging a delivery line at a point of the longitudinal wall of the cartridge housing, which is located first in the area of the unspent chemical and then, as the reaction front progresses, is located behind the reaction front after a certain time, it is possible to set an oxygen release profile with which the oxygen production first increases and then decreases. The delivery line opens into the interior space approximately in the center of the cartridge housing, approximately at equal distance from the activation point and from the reaction end point.

The mode of operation of the device according to the present invention is based on the fact that the thermal decomposition is first accelerated as long as the point at which the delivery line enters is located before the reaction front. However, once the reaction front has passed beyond the point of entry, the oxygen flows in the direction of the spent chemical, and the thermal decomposition decelerates. The shape of the profile of the oxygen release can be influenced by positioning the point of entry of the delivery line and by the length and the diameter of the cartridge housing. The profile may also be changed by connecting a plurality of delivery lines on the longitudinal side of the cartridge housing. The positioning of the point of entry approximately in the center of the cartridge housing represents a preferred embodiment. However, it is also possible to shift the point of entry closer to the activation point or toward the reaction end point.

In an advantageous application, a line, which is led out of the longitudinal side of a cartridge housing filled with oxygen-generating chemical, is used as a delivery line for the oxygen generated.

The various features of the novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
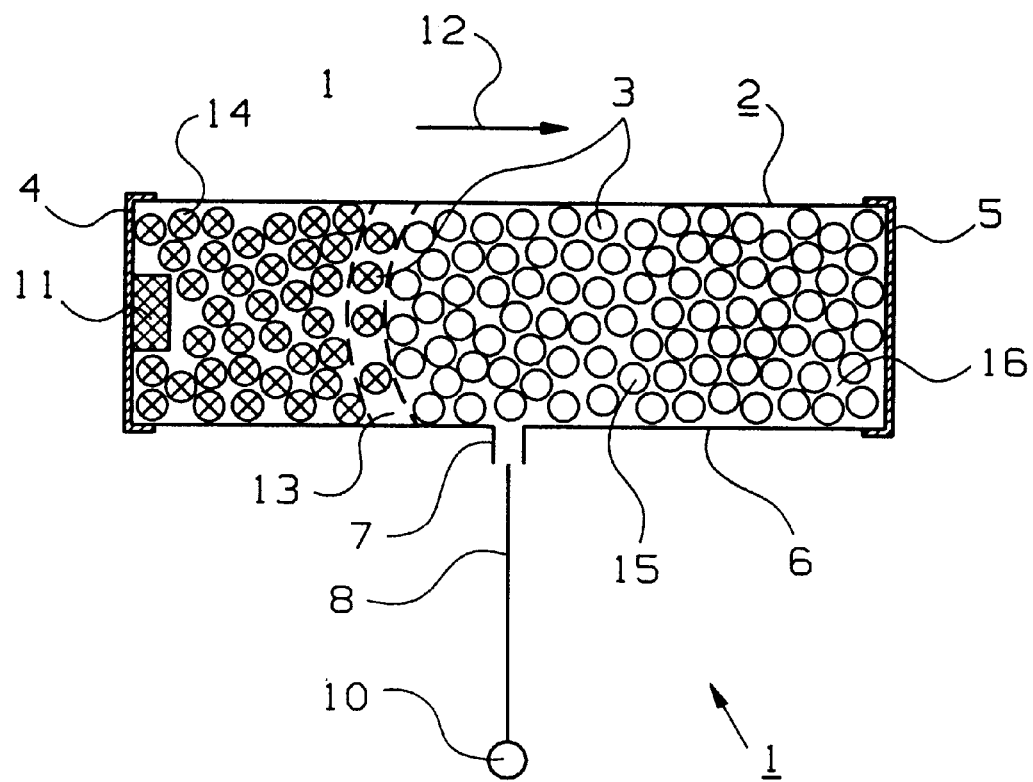
FIG. 1 is a schematic cross sectional view of a first device according to the present invention for generating oxygen.

Referring to the drawings in particular, the embodiment of FIG. 1 includes a device 1 for generating oxygen by the thermal decomposition of a chemical 3 located in a cartridge housing, which is in the form of a pile of molded objects. The cartridge housing 2 is closed with two cartridge covers 4, 5. A connecting branch 7 is provided for a delivery line 8. The delivery line 8 opens into the interior space of the cartridge housing 2 and delivers the oxygen generated to a user connection 10. The connecting branch 7 is located at the longitudinal side 6 of the cartridge housing 2. The left-hand cartridge cover 4 has an igniting means as an activation point 11. The reaction of the chemical 3 takes place along a reaction front 13 in the direction of an arrow 12, beginning from the activation point 11 to a reaction end point 16 at the right-hand cartridge cover 5, at which point the thermal decomposition of the chemical 3 comes to a standstill. The reaction front 13 separates spent chemical 14 from unspent chemical 15.

Figure 2:
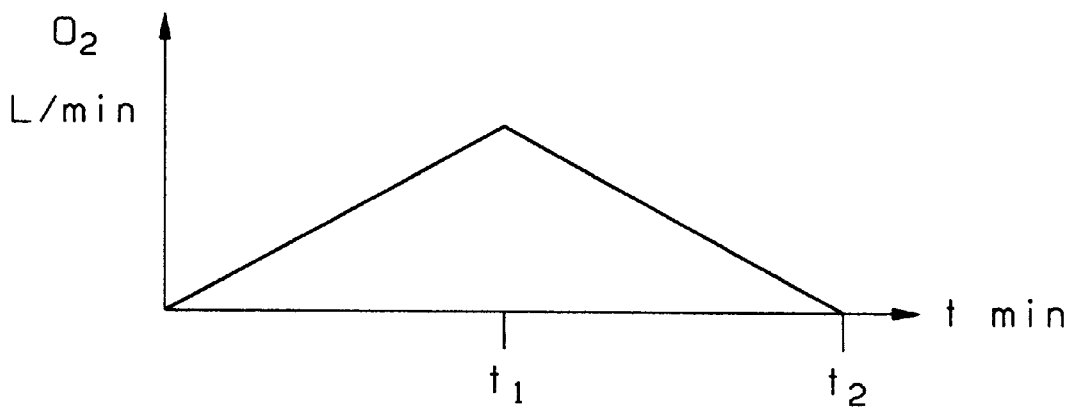
FIG. 2 is a diagram showing the oxygen production by the first device as a function of time.

FIG. 2 schematically illustrates the flow of oxygen at the user 10 over time. The flow of oxygen increases until the time $t=t_1$ and drops to zero at the time $t=t_2$. The reaction front 13 has just passed beyond the connecting branch 7 at the time $t=t_1$, while the reaction end point 16 is reached, i.e., the chemical 3 is reacted completely, at the time $t=t_2$.

The mode of operation of the first device 1 according to the present invention is as follows:

The gases and vapors, which are formed at the reaction front 13 and act catalytically on the unspent chemicals 15, are able to spread unhindered at the beginning of the chemical decomposition of the chemical 3, and the chemical reaction is accelerated. When the reaction front 13 has passed beyond the connecting branch 7 at the time $t=t_1$, the oxygen generated is guided opposite the direction of the arrow 12 to the connection branch, as a result of which the thermal decomposition of the unspent chemical 15 decelerates. The unspent chemical 15 is completely reacted and the oxygen production comes to a standstill at the time $t=t_2$.

Figure 3:
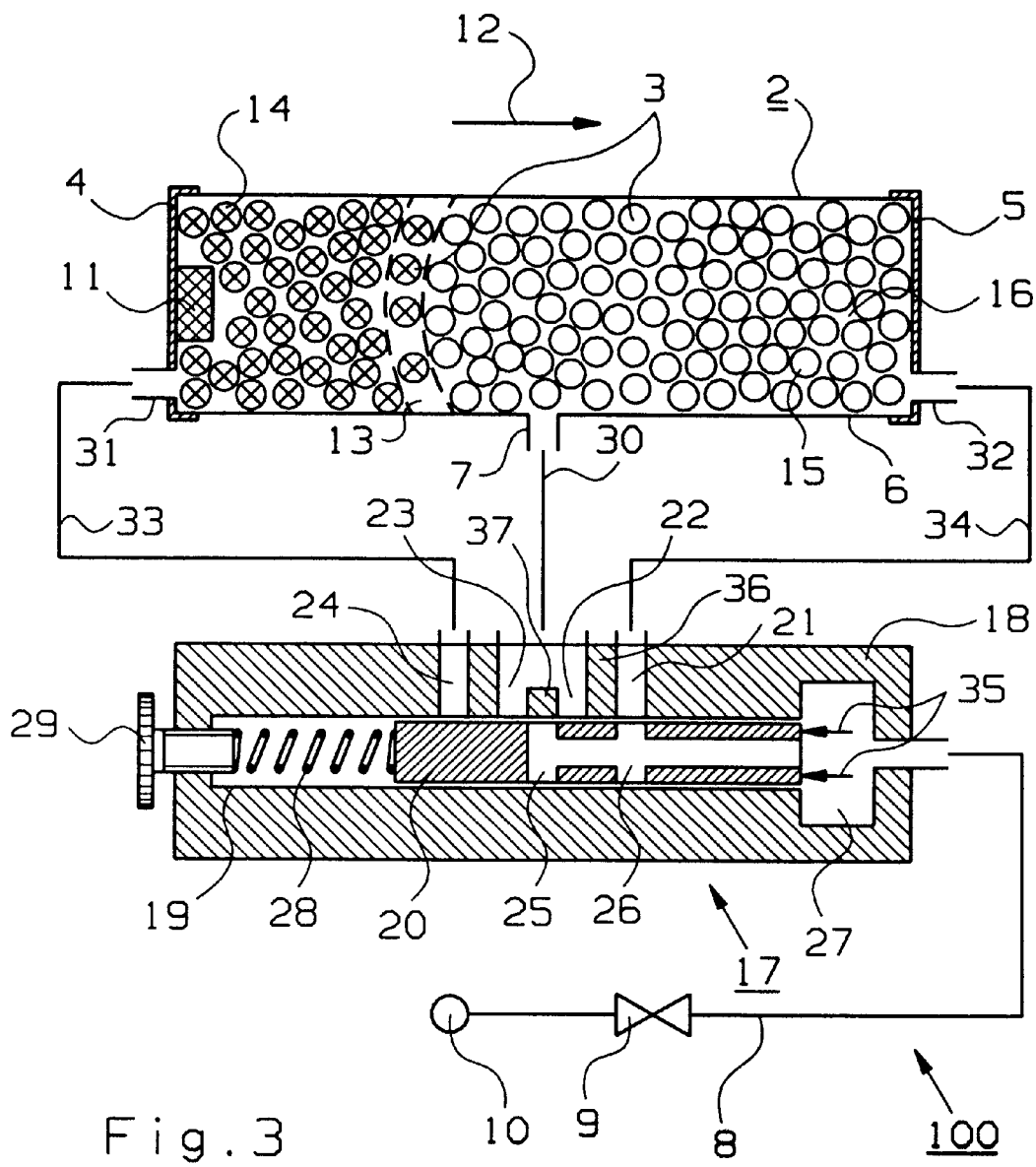
FIG. 3 is a schematic cross sectional view of a second device with a piston slide valve controller.

FIG. 3 shows a second device 100 according to the present invention, in which a piston slide valve controller 17 is connected to the cartridge housing 2. Identical components are designated with the same reference numbers as in FIG. 1. The piston slide valve controller 17 comprises a piston housing 18 with a hole 19, in which a piston 20 is accommodated axially movably. Gas-carrying housing channels 21, 22, 23, 24 are located in the piston housing 18, and the piston 20 has corresponding control channels 25, 26, which open into a collection channel 27 in the piston housing 18. The collection channel 27 is connected to the user 10 via the delivery line 8 and a throttling point 9. The piston 20 is supported within the hole 19 via a spring 28 against a thumbscrew 29, with which the pretension of the spring 18 can be adjusted. The housing channels 22, 23, which are connected to a common channel within the piston housing 18, are connected to the connecting branch 7 of the cartridge housing 2 via a line 30. The cartridge covers 4, 5 are also provided with connecting branches 31, 32, wherein the connecting branch 31 at the left-hand cartridge cover 4 is connected to the housing channel 24 via a first connection line 33, and the connecting branch 32 at the right-hand cartridge cover 5 is connected to the housing channel 21 via a second connection line 34.

The mode of operation of the second device 100 according to the present invention is as follows:

FIG. 3 shows the position of the piston 20 at the beginning of the thermal decomposition of the chemical, where the oxygen generated flows into the delivery line 8 via the second connection line 34, the housing channel 21, the control channel 26, and the collection channel 27. Since the oxygen can flow out of the cartridge housing 2 before the reaction front 13, the reaction is first accelerated. The oxygen flowing through the delivery line 8 generates a dynamic pressure at the throttling point 9, and this dynamic pressure propagates into the collection channel 27 and exerts a force on the piston 20 along the arrows 35. Since the oxygen production will increase further at first, the pressure in the collection channel 27 will also increase, the piston 20 will be displaced within the hole 19 against the force of the spring 28 along the arrows 35 until the control channel 25 is connected to the housing channel 23. The control channel 26 is closed by the housing wall piece 36 in this position of the piston 20. The oxygen now flows via the line 30 and the channels 23, 25 into the collection channel 27. Since the oxygen is still able to flow out of the cartridge housing 2 before the reaction front 13, the thermal decomposition is further accelerated. The channels 22, 26 are at first connected during the further increase in the oxygen production, as a result of which there is no change yet in the rate of the thermal decomposition, until the control channel 25 finally becomes aligned with the housing channel 24 during the further increase in the pressure in the collection channel 27, as a result of which the oxygen can flow out of the cartridge housing 2 via the first connection line 33, i.e., behind the reaction front 13, which is accompanied by a reduction in the oxygen production. The control channel 26 is closed by the housing wall piece 37 in this position of the piston 20. The piston 20 is again displaced in the direction of the collection channel 27 during a decrease in oxygen production, so that the line 30 is again opened partially and the thermal decomposition is thus accelerated.

Once the reaction front 13 has passed beyond the connecting branch 7, the relations of the thermal decomposition within the cartridge housing are reversed, i.e., the reaction decelerates when oxygen flows out of the line 30, because the oxygen is drawn off behind the reaction front 13. The consequence of this is that the piston 20 has its working point shifted in the direction of the collection channel 27, which is accompanied by a reduction in the level of oxygen production. Depending on the position of the piston 20, the thermal decomposition is accelerated when the oxygen flows out of the cartridge housing 2 predominantly via the second connection line 34, or it decelerates when the line 30 is connected to the collection channel 27.

Figure 4:
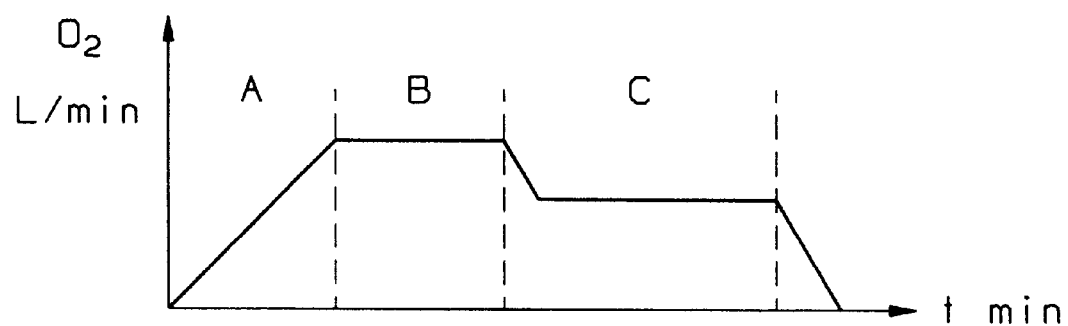
FIG. 4 is a diagram showing the oxygen production with the second device over time.

FIG. 4 shows the oxygen production that can be achieved with the piston slide valve controller 17 over time as a function of the chemical reaction time t.

The reaction is accelerated in section A, and the oxygen is drawn off from the cartridge housing 2 via the lines 30, 34. The reaction is decelerated in section B, and the oxygen is released via the first connection line 33 or alternatingly via the lines 30, 33.

Section C shows the oxygen production at a time at which the reaction front has passed beyond the connecting branch 7. Contrary to the sections A and B, the oxygen production is now decelerated when the line 30 is opened by the piston slide valve controller 17, because the connecting branch 7 is now located behind the reaction front 13. An approximately constant oxygen production level becomes established in section C by opening and closing the lines 30, 34 in the mutually opposite direction, but this oxygen production level is lower than in section B. The oxygen production level in the sections B and C can be adjusted by means of the thumbscrew 29. As an alternative to the thumbscrew 29, a lever mechanism, not shown in FIG. 3, whose path of adjusting is changed as a function of a preset value, e.g., of the ambient pressure, may be used to adjust the pretension of the spring 28.

While specific embodiments of the invention have been shown and described in detail to illustrate the application of the principles of the invention, it will be understood that the invention may be embodied otherwise without departing from such principles.

What is claimed is:

1. A device for generating oxygen by the thermal decomposition of a chemical, the device comprising:

a cartridge housing, said cartridge housing having an interior space, the chemical being disposed in said interior space, the chemical in said housing reacting into a spent chemical, and defining with said housing an activation point near one end of the housing from which the reaction propagates along a reaction front in said interior space of said cartridge housing in a direction of unspent chemical to a reaction end point, said cartridge housing having a longitudinal side;

a connection, which leads out of said longitudinal side of said cartridge housing about midway between said activation point and said reaction end point, the reaction front passes said connection during the reaction;

a delivery line drawing off oxygen being generated, said connection being in flow connection with said delivery line.

2. The device in accordance with claim 1, further comprising:

throttling point means provided with said delivery line;

an activation point connection adjacent to said activation point;

a reaction end point connection adjacent to said reaction end point;

a control device, said delivery line and said connection, said activation point connection and said reaction end point connection being connected together by said control device, said control device controlling a drawing off of oxygen before and after the reaction front depending on a pressure building up in said delivery line upstream of said throttling point means, said control unit includes a user connection in communication with said delivery line.

3. The device in accordance with claim 1, further comprising:

throttling point means provided with said delivery line;

an activation point connection line connected to said housing at said activation point;

a reaction end point connection line connected to said housing at said reaction end point;

a control device, said delivery line and said connection, said activation point connection line and said reaction end point connection line being connected together by said control device, said control device controlling a drawing off of oxygen before and after the reaction front depending on a pressure building up in said delivery line upstream of said throttling point means, said control unit includes a user connection in communication with said delivery line.

4. A device in accordance with claim 1, further comprising:

a user connection in communication with said delivery line for removing substantially all oxygen generated by the chemical through said delivery line.

5. A device in accordance with claim 1, wherein:

said cartridge housing includes closed longitudinal ends.

6. A device in accordance with claim 1, wherein:

said connection is an only communication between an inside and an outside of said cartridge housing.

7. A device in accordance with claim 2, wherein:

said user connection is also in communication with said activation end point connection and said reaction end point connection.

8. A device in accordance with claim 3, wherein:

said user connection is also in communication with said activation point connection line and said reaction end point connection line.

9. A process for generating oxygen by the thermal decomposition of a chemical, the process comprising the steps of:

providing a cartridge housing with an activation point end and a reaction end point end, said cartridge housing having a longitudinal side;

providing the chemical in said housing;

propagating a reaction of the chemical in said housing from said activation point end to said reaction end point end to generate oxygen;

drawing off substantially all of said oxygen of said reaction from a gas connection on said longitudinal side of said cartridge housing about midway between said activation point end and said reaction end point end, said reaction passing said gas connection during said propagating.

10. A process for generating oxygen by the thermal decomposition of a chemical, the process comprising the steps of:

providing a cartridge housing with an activation point end and a reaction end point end, said cartridge housing having a longitudinal side;

providing the chemical in said housing;

propagating a reaction of the chemical in said housing from said activation point end to said reaction end point end to generate oxygen;

drawing off said oxygen of said reaction from a gas connection on said longitudinal side of said cartridge housing about midway between said activation point end and said reaction end point end, said reaction passing said gas connection during said propagating;

drawing off said oxygen of said reaction from said activation point end and said reaction end point end;

feeding said oxygen from said gas connection, said activation point end and said reaction end point end to a user connection;

throttling said feeding of said oxygen upstream of said user connection;

controlling said feeding of oxygen depending on a pressure of said oxygen upstream of said throttling.

11. A process in accordance with claim 10, further comprising:

selectively drawing off said oxygen of said reaction from either a combination of said gas connection on said longitudinal side and said reaction end point end, and said combination of said connection on said longitudinal side and said activation point end.

* * * * *